(12) United States Patent  
Bhatia et al.

(10) Patent No.: US 8,693,022 B2  
(45) Date of Patent: Apr. 8, 2014

(54) DISTRIBUTED PRINT PROCESSING

(75) Inventors: Rajesh Bhatia, Bangalore (IN); Harish B. Kamath, Bengalooru (IN); Laurent Pizot, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 304 days.

(21) Appl. No.: 13/096,609

(22) Filed: Apr. 28, 2011

(65) Prior Publication Data

US 2012/0274976 A1 Nov. 1, 2012

(51) Int. Cl.
*G06K 15/00* (2006.01)
*G06F 3/12* (2006.01)
*G06F 15/76* (2006.01)

(52) U.S. Cl.
USPC ............................. 358/1.14; 358/1.15; 712/28

(58) Field of Classification Search
None
See application file for complete search history.

(56) References Cited

U.S. PATENT DOCUMENTS

| | | | |
|---|---|---|---|
| 7,180,614 B1 * | 2/2007 | Senoo et al. | 358/1.15 |
| 7,312,887 B2 | 12/2007 | Wu | |
| 2004/0252319 A1 * | 12/2004 | Gorp et al. | 358/1.13 |
| 2006/0092223 A1 * | 5/2006 | Ross et al. | 347/43 |
| 2007/0086052 A1 * | 4/2007 | Furuya | 358/1.15 |
| 2010/0225957 A1 | 9/2010 | Liu | |
| 2011/0007347 A1 | 1/2011 | Kamath et al. | |

OTHER PUBLICATIONS

"HP Unveils World's Most Collaborative Large-format Printer Solutions"; http://www8.hp.com/us/en/hp-news/article_detail.html?compURI=tcm:245-647881-16; Sep. 20, 2010; 3 pages.
"Novell Distributed Print ServicesTM (NDPS®)"; http://www.novell.com/products/ndps/; 1 page.
Brown, Eric; "Hp Launches ePrint Cloud Service and Four Web-enabled Printers"; Jun. 8, 2010; 5 pages.

* cited by examiner

*Primary Examiner* — Thomas Lett
(74) *Attorney, Agent, or Firm* — Garry A. Perry (57) ABSTRACT

In one embodiment, receipt of a print job at a printer is recognized. If the printer has a set of capabilities needed to meet requirements of the job, local processing is performed, and printing of the job at the printer is caused. If the printer does not have the set, and the printer and a print service available to the printer via a network together have the set, the job is sent to the service for remote processing. After the remote processing, the job is received at the printer from the service. Printing of the job, at the printer and in accordance with the requirements, is caused.

17 Claims, 5 Drawing Sheets

DISTRIBUTED PRINT PROCESSING

BACKGROUND

Driverless printing can make it possible for a user to print a print job at any one of set of printers available on a network, without the need to install separate drivers for different types of printers onto a client device. When a user sends a print request to a desired printer, rather than installing a driver for the printer at the sending computing device, the job may be sent to a print service accessible via a network. Raster image processing or other processing occurs at the print service to render the print job to a format that can be understood by the printer. After the processing of the job at the print service, print service sends the processed job to the printer via the network, and the printer prints job content onto a media.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

In some driverless printing systems, when a print job is submitted by a client device for printing at a desired printer connected to the client device via a network, the job is automatically sent to a print service on the network for rendering or other processing of the job. This arrangement may be efficient if the desired printer does not have the capability to process the print job on its own. For example, the desired printer may not have the ability to convert that type of print job to a page description language or other format that renders the document in a state for printing. In another example, the desired printer may have the software programming to convert the submitted job to a format that is needed for printing, but the desired printer does not have the processing power to process the print job within a reasonable timeframe.

However, if the desired printer has the capability to perform some or all of the processing of the print job, automatic sending the print job to the print service for processing can result in unnecessary time and expense. Various embodiments described below were developed in an effort to provide for distributed print processing that recognizes receipt of a print job at a printer, and makes a determination based upon requirements of the print job and capabilities of the printer as to where processing of the print job should occur to most efficiently accomplish the printing task. If the printer has a set of capabilities needed to meet requirements of the job, local processing and printing of the job both occur at the printer. If the printer does not have the set of capabilities, and the printer and a print service available to the printer via a network together have the set, the job is sent to the service for remote processing of the job. After the remote processing, the job is received at the printer from the service. Printing of the job occurs at the printer in accordance with the requirements. Utilizing the disclosed distributed print processing, the time and expense associated with driverless printing on a network is reduced as some or all of the processing of print jobs can be performed at a printer without sending the job to the print service. Accordingly, users will be more likely to utilize driverless printing systems, and user satisfaction will increase.

The embodiments shown in the accompanying drawings and described below are non-limiting examples. Other embodiments are possible and nothing in the accompanying drawings or in this Detailed Description of Embodiments should be construed to limit the scope of the disclosure, which is defined in the Claims.

The following description is broken into sections. The first section, labeled "Components", describes various physical and logical components utilized to implement various embodiments and describes environments in which the embodiments may be implemented. The second section, labeled as "Operation", describes steps taken to implement various embodiments.

Figure 1:
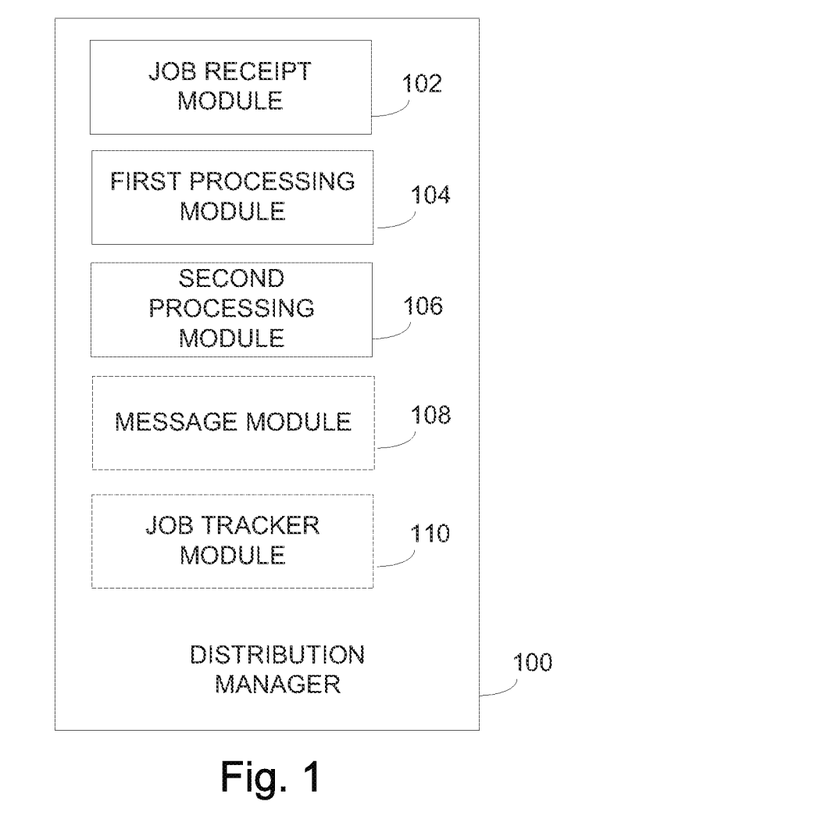
FIG. 1 depicts the physical and logical components of a distribution manager according to an embodiment.

COMPONENTS: FIG. 1 is an example block diagram illustrating the physical and logical components of a distribution manager 100. Distribution manager 100 represents generally any combination of hardware and programming configured for use to implement distributed print processing. Distribution manager 100 may be implemented in a number of environments, such as environment 200 of FIG. 2, environment 300 of FIG. 3, environment 400 of FIG. 4, and environment 500 of FIG. 5. In the example of FIG. 1, distribution manager 100 is shown to include a job receipt module 102, first processing module 104, second processing module 106, message module 108, and job tracker module 110.

Job receipt module 102 represents generally any combination of hardware and programming configured to recognize receipt of a print job at a printer. As used in this specification and the appended claims, a "print job" means one or more images submitted to be printed. As used in this specification and the appended claims, a "printer" includes any electronic device that prints and includes multifunctional electronic devices that perform additional functions such as scanning and/or copying. In examples, the image may be submitted to be printed as a document or file and in a variety of document and/or file formats.

In an example, the recognized print job may be a print job received at the printer via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP"). The print job may be received at the printer via a local area network ("LAN"), or via the Internet, an intranet, or another wide area network ("WAN"). In an example, the print job may be received from another computing device or a media via a proximity wireless protocol or personal area network ("PAN"), such as a Bluetooth™, Wi-Fi™, or other near field communication connection.

In an example, the print job may be received at the printer via a client computing device (e.g., a desktop, laptop, or mobile computing device) physically or wirelessly connected to the printer via a LAN, the Intranet, an intranet or other WAN, or a PAN. In another example, the recognized print job may be a print job received at the printer via a media (e.g., a USB flash drive, CD, DVD) or other memory device that can be physically connected (e.g., removably connected via a USB port) or wirelessly connected to the printer. In another example, the printer is a web-enabled printer and the recognized print job is received at the printer via the Internet or an intranet without the need of a client computing device to connect to the printer.

First processing module 104 represents generally any combination of hardware and programming configured to, if the printer has a set of capabilities needed to meet requirements of the print job, perform local processing and cause printing of the job at the printer. For purposes of this specification and the appended claims, a "capability" means a function or facility to carry out an operation or set of operations. For purposes of this specification and the appended claims, a "requirement" of a print job means a feature for the job that is requested by a user, or required as part of a rule that applies to print job. For example, rules set in place by a system administrator that printing at a particular printer will utilize "duplexing" and "black and white printing" functions are requirements. As used in this specification and the appended claims, a "set" of print requirements may be set of one, two, or more print requirements.

For purposes of this specification and the appended claims, "local processing" means processing that takes place at the printer. As used in this specification and the appended claims, "processing" of a print job means the conversion of the print job into a format that can be understood by the printer to enable printing of print job content onto a media. In an example, the local processing may include raster image processing ("RIP"), wherein vector digital instructions as to how the content is to be printed are utilized to create a high resolution raster or bitmap image of the content. The instructions may be expressed in a number of various languages and formats, including but not limited to HPGL/2 (Hewlett-Packard Graphics Language 2), PostScript, PDF (Portable Document Format), JPEG (Joint Photographic Experts Group standard), TIFF (Tagged Image File Format), PCL3 (Printer Command Language 3) and PCL 6 (Printer Command Language 6). In embodiments, the raster image processing may apply smoothing or interpolation algorithms to an input bitmap to generate an output bitmap image.

Second processing module 106 represents generally any combination of hardware and programming configured to, if the printer does not have the set of capabilities, and the printer and a print service available to the printer via a network together have the set, take the steps discussed below in this paragraph. The print job is sent to the print service for remote processing of the print job. After the remote processing at the print service, the print job is received at the printer from the service. The print job is caused to print at the printer in accordance with the requirements. As used in this specification and the appended claims, "remote processing" means that the processing takes place external to the printer, and is to be distinguished from "local processing" that takes place at the printer. For purposes of this specification and the appended claims, a "print service" means any combination of hardware and programming configured to perform remote processing of a print job. In an embodiment, the print service comprises a server or a server system, or other computing device or system of computing devices, accessible to the printer via a network. An example of a print service is the "HP ePrintCenter" service, offered by Hewlett Packard Company of Palo Alto, Calif. The HP ePrinterCenter enables users to print directly to select HP printers by attaching the print job to an email sent to the printer's email address. The HP ePrinterCenter may perform remote processing of the print job.

In an embodiment, a first set of print requirements that are received from a user is sent to the print service to be utilized or referenced during the remote processing. For example, a user may submit a print job to the printer with instructions to print using an economical draft mode, and to utilize A1 size media. The set including draft mode and A1 sizing print requirements are communicated to the print service. In one example, the first set of print requirement may be communicated to the service by including the requirements in the computer file that hold the print job. In another example, the first set of print requirements may be may communicated to the service by sending to the service, with the print job file, a separate computer file that holds the first set of print requirements.

In another embodiment, a second set of print requirements, comprising requirements that are not received from a user, are sent to the print service in addition to the first set from the user. In an example, a user may desire to print a document in Microsoft® Word DOCX format, and the user sends the print job to the printer along with the first instructions discussed in the preceding paragraph (print in an economical draft mode and utilize A1 size media). Upon detecting or determining that the printer does not support the DOCX format, but does support PDF, the second processing module may send to the service a second set of print requirements that includes a requirement that the print service convert the DOCX document to PDF format. Thus in this example the print service, after receiving the first and second sets of print requirements, utilizes or references the first set to print in a draft mode on A1 media, and also utilizes or references the second set to convert the document from DOCX format to the PDF format.

In embodiments, if the printer does not have the full set of capabilities, but the printer and a print service available to the printer via a network together have the set, the second processing module is additionally configured to perform local processing of the job at the printer. For example, it may be determined, by an administrator rule or by a design engineer, that certain requirements are within the capabilities of a printer and should be met via processing to occur at the printer, and other processing tasks are beyond the capabilities of the printer an should be met via processing to occur a the print service. The local processing may occur at the printer prior to sending the job to the service. In an example, the second processing module may recognize that a of raster image processing is within the capabilities of the printer, and that a language spell check processing task requires functionality not available at the printer. In this example, after local raster image processing, the print job is sent to the print service for remote processing to accomplish the language spell check. If the combination of local processing (raster processing) and remote processing (the language spell check) fails for some reason, the print job can be resent to the print service for remote processing that includes both the raster and spell check tasks. After the remote processing, the print job is received at the printer for printing on a media.

Alternatively, the local processing can occur after receiving the job at the printer from the service. Returning to the previously discussed example of a user desiring to print a document in Microsoft® Word DOCX format at a printer that does not support DOCX documents, the print service performs remote processing to that convert the DOCX file to a PDF format that is supported by the printer. After receipt of the print job from the print service in PDF format for storage or browsing, local processing of the job takes place at the printer to convert the PDF file into a print ready PCL3GUI3 or other bitmap image format. After the local conversion, content of the print job is printed on a media.

In an embodiment, distribution manager 100 additionally includes a message module 108. Message module 108 represents generally any combination of hardware and programming configured to send to a display device a message that printing will not occur in response to determining that neither the printer, nor the printer together with the print service, have the set of capabilities. For purposes of this specification and the appended claims, "display device" means any combination of hardware and programming configured to exhibit or present the message or other information for perception by a user, and can include, but is not limited to, a visual, tactile or auditory display. The display device may be a monitor, a touchscreen, a projection device, or other means of presenting a visual display of a message. In embodiments, the display device may be Braille display device or other means of presenting a tactile display. In embodiments, the display device may include a speaker to enable an auditory display of the message.

In an example, a user desires to send a print job from her mobile device to a printer located at an airport location that is equipped for wireless internet access. The user is not familiar with the desired printer's capabilities or features. Rather than downloading a driver for the printer, the user sends the print job to an internet accessible distribution server that includes the functionality of distribution manager 100. When the user sends the print job to the distribution server, she also sends requirements that the job be printed in color on a glossy, A1-sized media. The distribution server recognizes receipt of the print job, and then recognizes, after evaluating the printer capabilities and its own capabilities, and the requirement, that the desired printer does not support color printing (e.g., the desired printer is not a color printer, or the desired printer is a color printer but is out of color supplies). In response to determining that neither the printer, nor the printer together with the service, have the set of capabilities needed to meet the requirements, a message communicating that printing will not occur at the desired printer is sent to be displayed on the mobile device's touchscreen. An example message is "printing at the selected printer will not occur because at least one of the user print requirements is not supported." Another example message that might be displayed is "Please choose another available printer as your print request is not within the capabilities of the requested printer." The foregoing example messages are not meant to be an exclusive list and many other variants are possible.

In an embodiment, distribution manager 100 additionally includes a job tracker module 110. Job tracker module 110 represents generally any combination of hardware and programming configured to send data to the print service that tracks print jobs printed at the printer, including those jobs printed with local processing. This allows the print service to maintain a consolidated view and record of jobs printed at the printer that includes jobs processed at the print service, and jobs processed locally at the printer. Job metadata can be updated on the print server as printing occurs, or following printing. In an embodiment, upon request of an owner of the printer, the print server may be caused to send to a display device a report that includes tracking of print jobs printed at the printer, the report including jobs processed with local processing.

Figure 2:
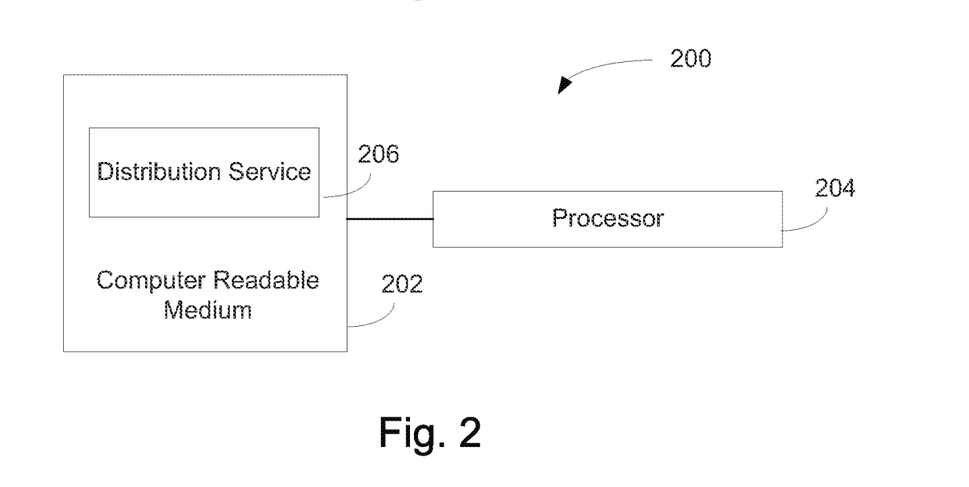
FIGS. 2-5 depict example distribution services according to embodiments.

Distribution manager 100 may be implemented in a number of environments, such as environment 200 of FIG. 2. Environment 200 includes a computer readable medium 202, and a processor 204. In a given implementation, computer readable medium 202 may represent multiple computer readable media and processor 204 may represent multiple processors.

Computer readable medium 202 represents generally any medium that can contain, store, or maintain programs and data for use by or in connection with the instruction execution system. Computer readable medium can comprise any one of many physical media such as, for example, electronic, magnetic, optical, electromagnetic, or semiconductor media. More specific examples of suitable computer-readable media include, but are not limited to, hard drives, random access memory (RAM), read-only memory (ROM), erasable programmable read-only memory, flash drives, compact discs, and digital video discs. In an embodiment, a number of software components are stored in the computer-readable medium 202 and are executable by processor 204. In this respect, the term "executable" includes a program file that is in a form that can be directly (e.g., machine code) or indirectly (e.g., source code that is to be compiled) performed by the processor 204. An executable program may be stored in any portion or component of computer readable medium 202.

Processor 204 represents generally any instruction execution system, such as a computer/processor based system or an ASIC (Application Specific Integrated Circuit), a computer, or other system that can fetch or obtain instructions or logic from computer-readable medium 202 and execute the instructions or logic contained therein.

Computer readable medium 202 is shown to include distribution service 206. Distribution service 206 represents generally any programming, that, when executed, implements the functionality of the distribution manager 100 of FIG. 1. In an embodiment, distribution service 206, when executed by processor 304, or any computer, is responsible for recognizing receipt of a print job at a printer. If the printer has a set of capabilities needed to meet requirements of the job, local processing is performed, and the job is caused to be printed, at the printer. If the printer does not have the set of capabilities to meet the requirements for the print job, and the printer and a print service available to the printer via a network together have the set, the job is sent to the print service for remote processing of the job. After the remote processing of the job at the print service, the job is received at the printer from the service. Printing of the job, in accordance with the requirements, is caused to occur at the printer.

Figure 3:
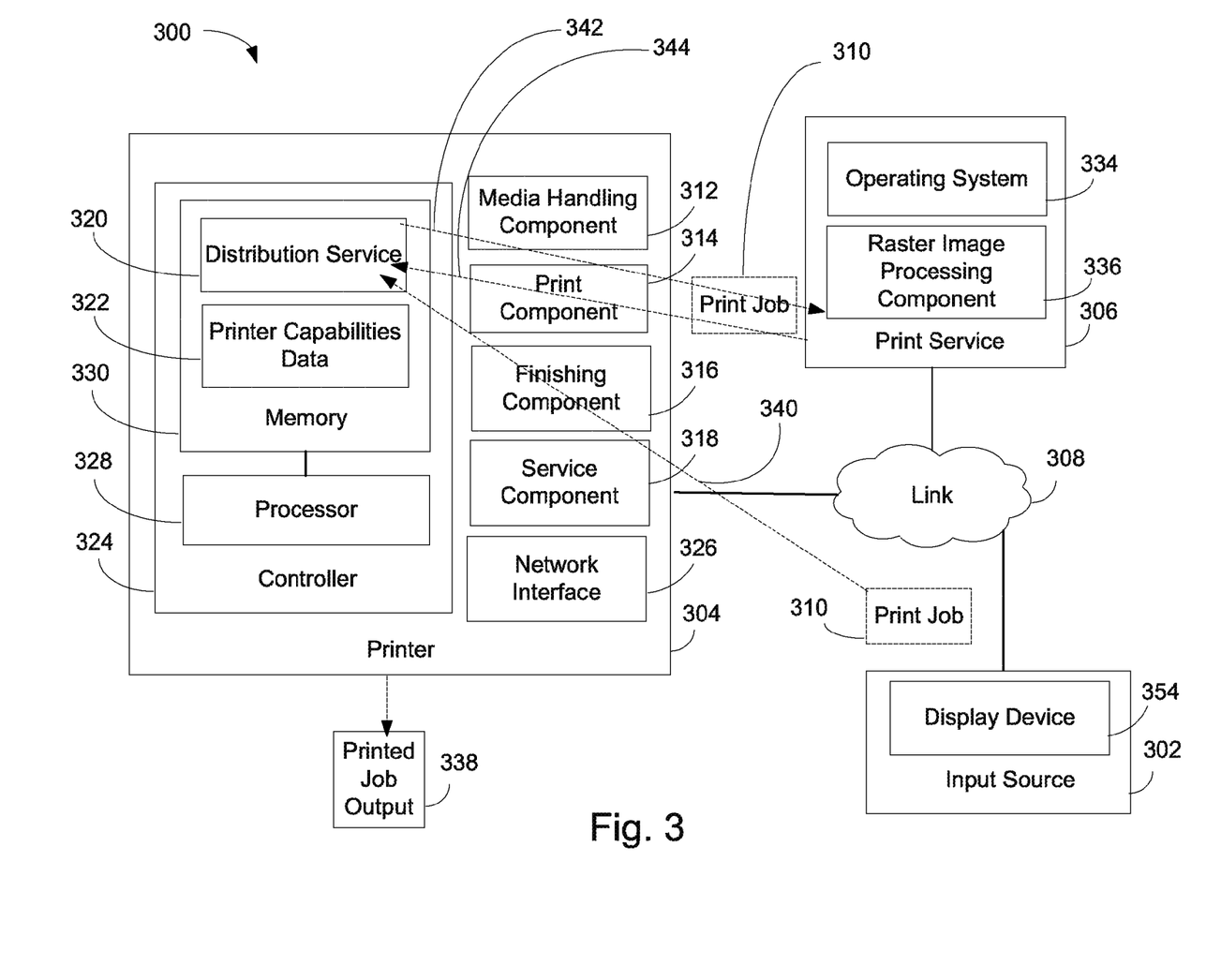

Distribution manager 100 may also be implemented in an environment such as environment 300 of FIG. 3. Environment 300 is shown to include an input source 302, a printer 304, and a print service 306 interconnected via link 308.

Input source 302 represents generally any combination of hardware and software capable of sending or providing a print job 310 to printer 304. In an embodiment, input 302 may be a client computing device (e.g., a desktop, laptop, or mobile computing device) physically or wirelessly connected to the printer 304 via link 308. In another example, the input source 302 may be a media (e.g., a USB flash drive, CD, DVD) or other memory device that can send or provide a print job 310 to printer 304. In another embodiment, input source 302 may be a web-enabled printer connected to printer 304 via link 308. The print job 310 may be downloaded to the web-enabled printer via a printer application that is and hosted by a remote server and accessible to the web-enabled printer via the internet.

Printer 304 represents generally any computing device operable to receive and process responses to requests to print content and to produce printed output. Printer 304 is capable of receiving a print job from input source 302, and in embodiments, of communicating information relating to the received print job and/or the printed output back to the input source 302. Printer 304 is shown to include media handling component 312, print component 314, finishing component 316, service component 318, distribution service 320, printer capabilities data 322, controller 324, and network interface 326.

Media handling component 312 represents generally any combination of hardware and programming capable of transporting media through the printer 304. The media may be supplied for printing via a media roll, the media roll positioned within, or adjacent, to a housing of printer 304 during printing operations. Print component 314 represents generally any combination of elements capable of being utilized to form desired images on media. In a given example, print component 314 may include a fluid ejection mechanism, each fluid ejection mechanism including multiple printheads configured to dispense ink or other fluid. As used in this specification and the appended claims, "printhead" includes a mechanism having a plurality of nozzles through which ink or other fluid is ejected. Examples of printheads are drop-on-demand inkjet printheads, thermo resistive printheads, piezo and resistive printheads. Some printheads may be part of a cartridge which also stores the fluid to be dispensed. Other printheads are standalone and are supplied with fluid by an off-axis ink supply. Finishing component 316 represents generally any combination of hardware and programming capable of performing a finishing operation on media. Such finishing operations include cutting, folding, laminating or any other action that affects the physical nature of the media. Service component 318 represents generally any combination of elements capable of being utilized to service print component 314. In an example, service component 318 may be configured to function as a spittoon and an alignment calibrator to service printheads.

Distribution service 320 represents generally any programming, that, when executed, implements the functionality of the distribution manager 100 of FIG. 1. In particular, distribution service 320, when executed by processor 328, is responsible for recognizing receipt of the print job 310, from input source 302, at printer 304. In this example, the print job 310 is received 340 at the distribution service from input source 302, via link 308. The print job 310 may be in a one of a variety of document and/or file formats, including but not limited to JPG, DOC, DOCX, PDF, TIFF, XLS, PPT, PPTX, OR Open Office formats.

The printer capabilities data for printer 304 stored at memory 330 is analyzed in light of received requirements for the print job 310. If the printer 304 has a set of capabilities needed to meet requirements of the print job 310, the printer 304 performs local processing and causes printing of the job at the printer to produce printed job output 338. In embodiments, the local processing may include raster image processing at printer 304.

If the printer 304 does not have the set of capabilities needed to meet the requirements of the print job 310, and the printer 304 and a print service 306 available to the printer via a network together have the set, the print job 310 is sent 342 to the print service 306 for remote processing. The remote processing may include raster image processing of the print job 310 at raster image processing component 336 to convert the print job 310 to a high resolution raster or bitmap image format.

After the remote processing at the print service 306, the print job is received 344 at the printer 304 from the print service 306. The print job is then caused to print at the printer 304 to produce the printed job output 338 in accordance with the requirements.

In an embodiment, a first set of print requirements that are received from a user is sent to the print service to be utilized or referenced during the remote processing. In another embodiment, a second set of print requirements, comprising requirements that are not received from a user, are sent to the print service in addition to the first set of requirements that are from the user.

In embodiments, if the printer 304 does not have the full set of capabilities, but the printer and the print service 306 available to the printer via a network together have the set, the second processing module is additionally configured to perform local processing of the print job 310 at the printer. The local processing may occur before, or after, the sending the print job 310 to the print service 306.

In an embodiment, data is sent to print service 306 that tracks print jobs printed printer 304, including print job 310. This allows the print service 306 to maintain a record of jobs printed at the printer that includes jobs processed at the print service 306, and jobs processed locally at printer 308. Job metadata is updated at the print server 306 as printing occurs, or following printing. Upon a request from an authorized entity, e.g. an owner of the printer, the print server may be caused to send to the entity, via a display device 354 incorporated in the input source 302, a report that includes tracking of print jobs, including job 310, printed at the printer.

Printer capabilities data 322 represents generally a collection or database of information regarding the capabilities of printer 304 stored in memory 330. In an example, the collection or database of information may include, but are not limited to, capabilities information relating to printer model, media capabilities, color/black and white, document formats supported, tray contents, and web application capabilities.

As used in this specification, controller 324 represents generally any combination of elements capable of coordinating the operation of components 312, 314, 316, 318, and 320. In a given implementation, controller 324 includes a processor 328 and a memory 330. The processor 328 may represent multiple processors, and the memory 330 may represent multiple memories. In an embodiment, the controller 324 may include a number of software components that are stored in a computer-readable medium, such as memory 330, and are executable by processor 328. In this respect, the term "executable" includes a program file that is in a form that can be directly (e.g. machine code) or indirectly (e.g. source code that is to be compiled) performed by the processor 328. An executable program may be stored in any portion or component of memory 330.

Network interface 326 represents generally any combination of hardware and programming configured for electronically connecting computing web enabled printer 304 to link 308. In an embodiment, network interface 326 may include a network interface card, a network adapter, a network interface controller, and or a LAN adapter. Network requests may be sent and received utilizing a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

Print service 306 represents generally any combination of hardware and programming configured to perform remote processing, i.e., processing not occurring at printer 304, of print job 310. In an embodiment, the print service 306 comprises a server or a server system, or other computing device or system of computing devices, accessible to the printer 304 via the internet or another network. Print service 306 is shown to include operating system 334 and raster image processor 336. Operating system 334 represents generally any software platform on top of which other programs or applications such as raster image processing component 336 run. Examples include Linux® and Microsoft® Windows. Raster image processing component 336 represents generally any combination of hardware and software capable of converting digital information about fonts and graphics that describes the appearance of a desired image (e.g. information from a drawing or desktop publishing application) in a print job 310, and translating that information into a plot composed of individual dots that printer 304 can output. In embodiments, a raster image processing component 336 composes a page layout.

Input source 302, web-enabled printer 304 and print service 306 are interconnected via link 308. Link 308 represents generally one or more of a cable, wireless, fiber optic, or remote connection via a telecommunication link, an infrared link, a radio frequency link, or any other connectors or systems that provide electronic communication. Link 308 may include, at least in part, an intranet, the internet, or a combination of both. Link 308 may also include intermediate proxies, routers, switches, load balancers, and the like. The paths followed by link 308 between input source 302, web-enabled printer 304 and print service 306 as depicted in FIG. 3 represent the logical communication paths between these devices, not necessarily the physical paths between the devices.

Figure 4:
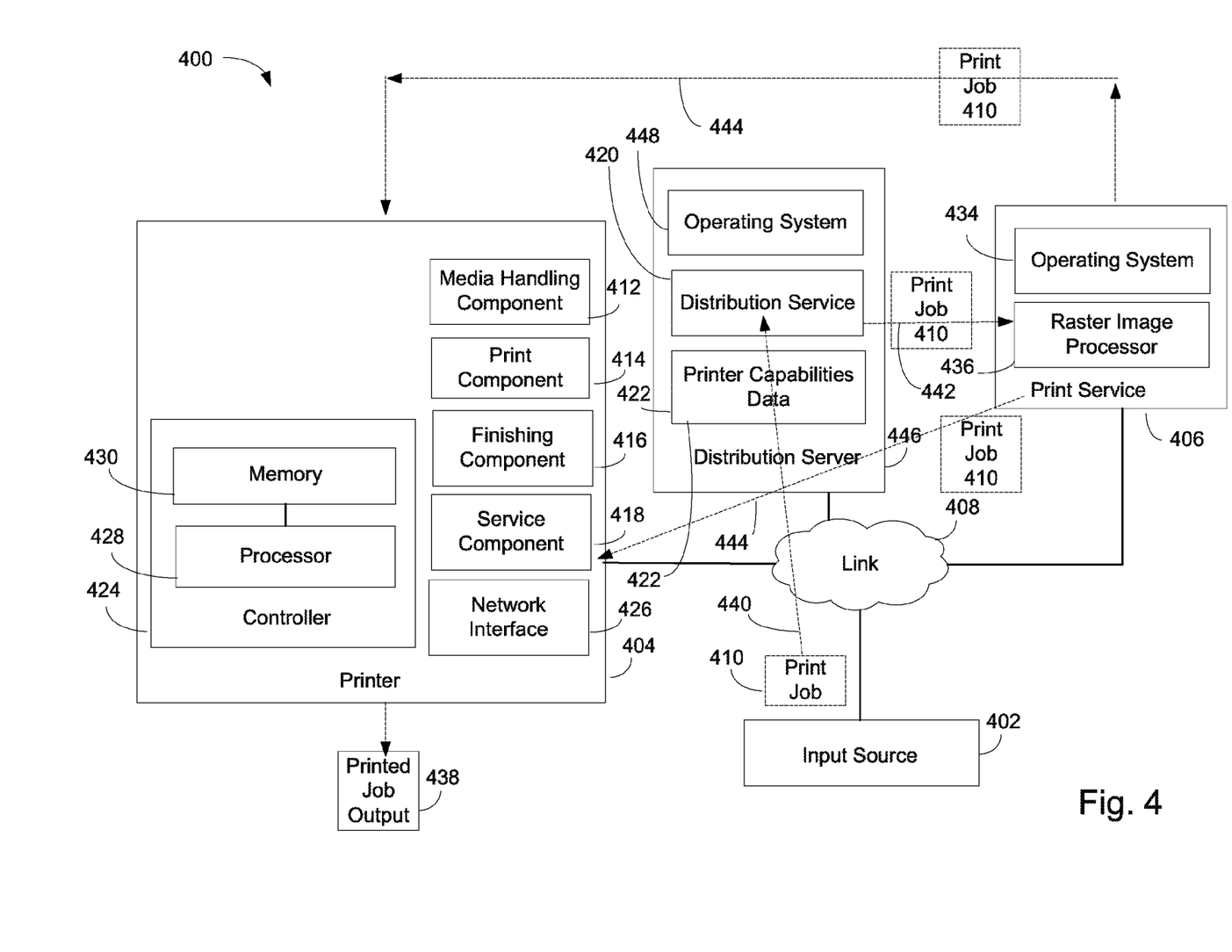

Distribution manager 100 may also be implemented in an environment such as environment 400 of FIG. 4. Environment 400 includes input source 402, printer 404, distribution server 446, and print service 406 interconnected via link 408.

Input source 402 represents generally any combination of hardware and software capable of sending or providing a print job 410 to printer 404. Printer 404 represents generally any computing device operable to receive and process responses to requests to print content and to produce printed output.

Printer 404 is capable of receiving a print job from input source 402, and is substantially the same as printer 304 of FIG. 3 except that printer 404 does not include a distribution service or printer capabilities data as does printer 304 of FIG. 3. The descriptions of the FIG. 3 media handling component 312, print component, 314, finishing component 316, service component 318, and network interface 326 can be applied to the FIG. 4 media handling component 412, print component, 414, finishing component 416, service component 418, and network interface 426. The descriptions of the FIG. 3 controller 324, memory 330 and processor 328 can be applied to the FIG. 4 controller 424, memory 430 and processor 428.

Print service 406 represents generally any combination of hardware and programming configured to perform remote processing, i.e., processing not occurring at printer 404, of print job 410, and is substantially the same as print service 306 of FIG. 3. The descriptions of print service 306, and it components, of FIG. 3 can be applied to the FIG. 4 print service 406 and its components.

Distribution server 446 represents generally any computing device, or multiple computing devices, capable of receiving and responding to web requests from printer 404 and print service 406, via link 408. Distribution server 446 is shown to include operating system 448 and printer capabilities data 422. Operating system 448 represents generally any software platform on top of which other programs or applications such as distribution service 420 run. Printer capabilities data 422 represents generally a collection or database of information regarding the capabilities of printer 404 stored in at distribution server 446. In embodiments, the printer capabilities data 322 will include information regarding a fleet of printers, grouped by network, by enterprise, type, etc., the fleet including printer 404.

Distribution service 420 represents generally any programming, that, when executed, implements the functionality of the distribution manager 100 of FIG. 1. In particular, distribution service 420, when executed by processor 428, is responsible for recognizing receipt of the print job 410, from input source 402, at printer 404. In this example, the print job 410 is received 440 at the distribution service from input source 402, along with requirements for the print job 410 embedded as metadata in the job, via link 408. The printer capabilities data 422 for printer 404 stored at distribution server 446 is analyzed in light of the requirements. If the printer 404 has a set of capabilities needed to meet requirements of the print job 410, the printer 404 performs local processing and causes printing of the job at the printer to produce printed job output 438. If the printer 404 does not have the set of capabilities needed to meet the requirements of the print job 410, and the printer 404 and a print service 406 available to the printer via a network together have the set, the print job 410 is sent 442 to the print service 406 for remote processing. The remote processing may include raster image processing of the print job 410 at raster image processing component 436 to convert the print job 410 to a bitmap format. After the remote processing at the print service 406, the print job is received 444 at the printer 404 from the print service 406. The print job is then caused to print at the printer 404 to produce the printed job output 438 in accordance with the requirements.

Link 408 represents generally one or more of a cable, wireless, fiber optic, or remote connection via a telecommunication link, an infrared link, a radio frequency link, or any other connectors or systems that provide electronic communication. Link 408 may include, at least in part, an intranet, the internet, or a combination of both.

Figure 5:
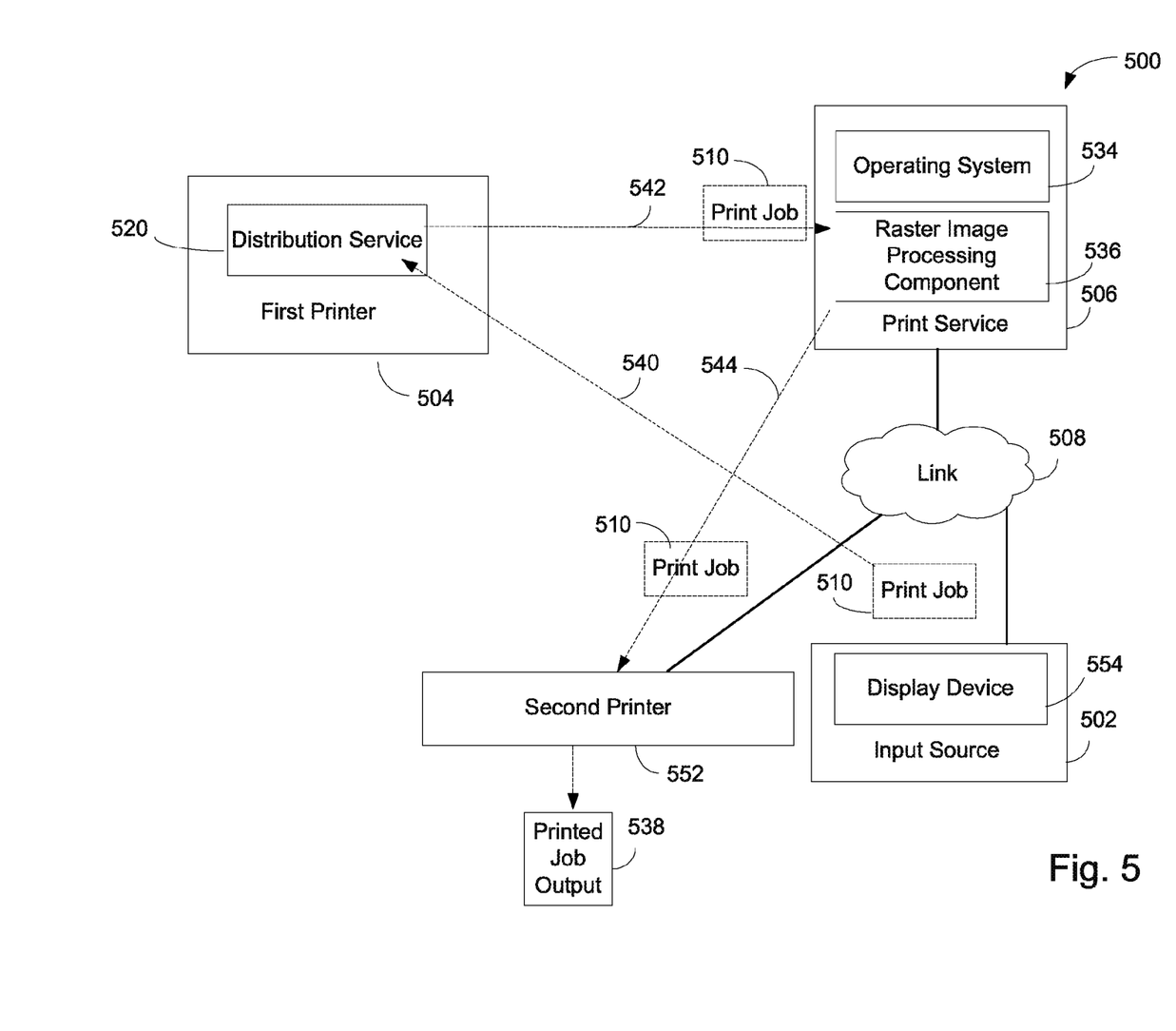

Distribution manager 100 may also be implemented in an environment such as environment 500 of FIG. 5. Environment 500 includes input source 502, printer 504, and print service 506 interconnected via link 508.

Input source 502 represents generally any combination of hardware and software capable of sending or providing a print job 510 to printer 504. Printer 504 is capable of receiving a print job from input source 502, and is substantially the same as printer 304 of FIG. 3 and can be understood as including the components displayed as part of printer 304. The descriptions of the FIG. 3 printer 304 and its components can be applied to the FIG. 5 printer 504. Print service 506 represents generally any combination of hardware and programming configured to perform remote processing of print job 510, and is substantially the same as print service 306 of FIG. 3. Print service 506 can be understood as including the components displayed as part of print service 306. The descriptions of the FIG. 3 print service 306 and its components can be applied to the FIG. 5 print service 506.

Distribution service 520 represents generally any programming, that, when executed, implements the functionality of the distribution manager 100 of FIG. 1. In particular, distribution service 520, when executed by a processor, is responsible for recognizing receipt 540 of a print job at a first printer 504. In this example, the print job 510 is received 540 at the distribution service 520 from input source 502, via link 508. If the first printer 504 has a set of capabilities needed to meet requirements of the print job 510, local processing is performed at the first printer 504, and printing of the job 510 caused at a second printer 552 connected to the first printer 504 via link 508.

If the first printer 504 does not have the set of capabilities, and the first printer 504 together with the print service 506 available to the first printer 504 via the link 508 together have the set, the job 510 is sent 542 to the print service 506 for remote processing of the job 510. After the remote processing, the print service 506 is caused to send 544 the job 510 to a second printer 552 for printing at second printer 552 in accordance with the requirements. If the distribution service 520 determines that neither the first printer 504, nor the first printer 504 together with the service 506, have the set of capabilities, a message is sent to a display device 554 that is a component of the input source 502. The message is to inform a user that printing will not occur, as the print job requirements cannot be met.

Link 508 represents generally one or more of a cable, wireless, fiber optic, or remote connection via a telecommunication link, an infrared link, a radio frequency link, or any other connectors or systems that provide electronic communication. Link 508 may include, at least in part, an intranet, the internet, or a combination of both.

In the foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media. Components operating on different devices, then, may utilize different processors and memory media.

Figure 6:
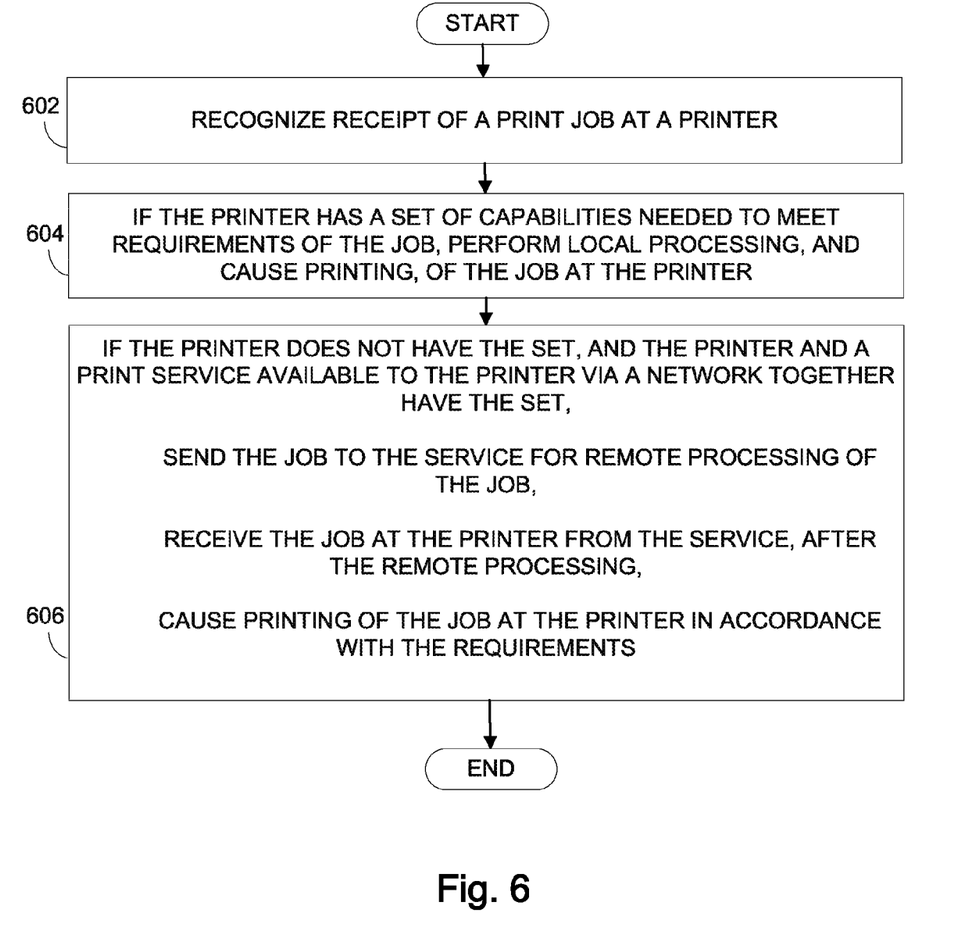
FIG. 6 is an example flow diagram depicting steps taken to implement various embodiments.

OPERATION: FIG. 6 is an example of steps taken to implement various embodiments. In discussing FIG. 6, reference may be made to the diagrams of FIGS. 1-5 to provide contextual examples. Implementation, however, is not limited to those examples. FIG. 6 depicts a workflow from the perspective of an interactive build service such as distribution service 206 of FIG. 2, distribution service 320 of FIG. 3, distribution service 420 of FIG. 4, or distribution service 520 of FIG. 5.

Starting with FIG. 6, receipt of a print job is recognized at a printer (block 602). Referring back to FIG. 1, the job receipt module 102 may be responsible for implementing block 602.

Continuing with the flow diagram of FIG. 6, if the printer has a set of capabilities needed to meet requirements of the job, local processing is performed, and printing of the job at the printer is caused (block 604). Referring back to FIG. 1, the first processing module 104 may be responsible for implementing block 604.

Continuing with the flow diagram of FIG. 6, if the printer does not have the set, and the printer and a print service available to the printer via a network together have the set, the job is sent to the service for remote processing of the job. After the remote processing, the job is received at the printer. Printing of the job is caused at the printer in accordance with the requirements (block 606). Referring back to FIG. 1, the second processing module 106 may be responsible for implementing block 606.

CONCLUSION: The diagrams of FIGS. 1-5 are used to depict the architecture, functionality, and operation of various embodiments. Various components illustrated in FIGS. 1-5 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein.

Although the flow diagram of FIG. 6 shows specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed:

1. A non-transitory computer-readable storage medium containing instructions for distributed print processing, the instructions when executed causing a distribution server to:
   receive, by the distribution server, a print job also received at a printer;
   recognize, by the distribution server, receipt of the print job at the printer;
   determine, by the distribution server, whether the printer has a set of capabilities needed to meet requirements of the print job;
   if the distribution server determines that the printer has the set, cause, by the distribution server, the printer to perform local processing of and to print the print job;
   if the distribution server determines that the printer does not have the set, and the printer and a print service available to the distribution server via a network together have the set,
      send, by the distribution server, the print job to the print service for remote processing of the print job, the print service performing the remote processing and thereafter sending the print job to the printer;
      cause, by the distribution server, the printer to print the print job after the printer receives the print job from the print service.

2. The medium of claim 1, wherein the printer performs the local processing of the print job if the printer does not have the set, and the printer and the print service available to the distribution via the network together have the set.

3. The medium of claim 2, wherein the local processing at the printer occurs prior to the print job being sent to the print service.

4. The medium of claim 2, wherein the local processing occurs after receiving the print job at the printer from the print service.

5. The medium of claim 1, wherein the instructions further cause the distribution server to send, to a display device, a message that printing will not occur in response to determining that neither the printer, nor the printer together with the print service, have the set of capabilities.

6. The medium of claim 1, wherein the local processing comprises a conversion of the print job to a bitmap format.

7. The medium of claim 1, wherein the remote processing comprises a conversion of the print job from a document format not supported by the printer to a format supported by the printer.

8. The medium of claim 1, wherein the instructions further cause the distribution server to send data to the print service that tracks the print job printed at the printer with the local processing.

9. The medium of claim 8, wherein the instructions further cause the distribution server to send to a display device a report including tracking of print jobs processed with local processing and printed at the printer.

10. The medium of claim 1, wherein the print job is received at the printer via:
a memory device removably connected to the printer, or
a proximity wireless protocol.

11. A system for distributed print processing, comprising:
a distribution server;
a job receipt module at the distribution server, configured to receive a print job and recognize receipt of the print job at a printer separate from the distribution server;
a first processing module at the distribution server, configured to, determine whether the the printer has a set of capabilities needed to meet requirements of the print job, and if the printer has the set, cause the printer to perform local processing of and to print the print job;
a second processing module at the distribution server, configured to, if the printer does not have the set, and the printer and a print service available to the distribution server via a network together have the set, the print service separate from the distribution server:
send the print job from the distribution server to the print service for remote processing of the print job, the print service performing the remote processing and thereafter sending the print job to the printer;
cause the printer to print the print job after receiving the print job from the print service.

12. The system of claim 11, further comprising a message module at the distribution server, configured to send, to a display device, a message that printing will not occur in response to determining that neither the printer, nor the printer together with the print service, have the set of capabilities.

13. The system of claim 11, further comprising a job tracker module at the distribution server, configured to:
send to the print service data that tracks a print job printed at the printer with local processing, and
send to a display device a report including tracking of print jobs processed with local processing and printed at the printer.

14. The system of claim 11, wherein the remote processing comprises a conversion of the print job from a document format not supported by the printer to a format supported by the printer.

15. A method for distributed print processing, comprising:
receiving, by a distribution server, a print job also received at a printer separate from the distribution server;
recognizing, by the distribution server, receipt of the print job at a first the printer;
determining, by the distribution server, whether the printer has a set of capabilities needed to meet requirements of the print job;
if the first printer has the set, causing, by the distribution server, the printer to perform local processing of and to print the print job;
if the first printer does not have the set, and the first printer together with a print service available to the distribution server via a network together have the set, the print service separate from the distribution server,
sending, by the distribution server, the print job to the print service for remote processing of the print job, the print service performing the remote processing and thereafter sending the print job to the printer directly such that the printer receives the print job from the print service and not from the distribution server;
cause, by the distribution server, the printer to print the print job after the printer receives the print job from the print service.

16. The method of claim 15, further comprising sending to the print service a first set of print requirements received from a user and a second set of print requirements not received from the user.

17. The method of claim 15, further comprising sending, to a display device, a message that printing will not occur in response to determining that neither the printer, nor the printer together with the print service, have the set of capabilities.

* * * * *

UNITED STATES PATENT AND TRADEMARK OFFICE
CERTIFICATE OF CORRECTION

PATENT NO.         : 8,693,022 B2                          Page 1 of 1
APPLICATION NO.    : 13/096609
DATED              : April 8, 2014
INVENTOR(S)        : Rajesh Bhatia et al.

It is certified that error appears in the above-identified patent and that said Letters Patent is hereby corrected as shown below:

In the Claims

In column 13, line 16, in Claim 11, delete "the the" and insert -- the --, therefor.

In column 14, line 12, in Claim 15, after "at" delete "a first".

Signed and Sealed this
Twenty-ninth Day of September, 2015

Michelle K. Lee
*Director of the United States Patent and Trademark Office*